United States Patent
Sakata

[11] Patent Number: 6,115,649
[45] Date of Patent: Sep. 5, 2000

[54] VENDING MACHINE AND DISTRIBUTION MANAGEMENT SYSTEM

[75] Inventor: Haruhiro Sakata, Shizuoka, Japan

[73] Assignee: Crestech International Corporation, Ltd., Shizuoka, Japan

[21] Appl. No.: 08/967,820

[22] Filed: Nov. 12, 1997

[30] Foreign Application Priority Data

Nov. 12, 1996 [JP] Japan .................. 8-300708

[51] Int. Cl.$^7$ ............................. G06F 17/00
[52] U.S. Cl. ............ 700/241; 700/234; 700/236; 700/244; 221/3; 221/8; 221/9
[58] Field of Search .......... 364/479.11, 479.01, 364/479.02, 479.04, 479.06, 479.14; 221/3, 9, 24, 8

[56] References Cited

U.S. PATENT DOCUMENTS

| | | | |
|---|---|---|---|
| 4,412,292 | 10/1983 | Sedam et al. | 364/479.11 |
| 4,682,709 | 7/1987 | Brandes et al. | 221/2 |
| 5,091,713 | 2/1992 | Horne et al. | 364/479.11 |
| 5,097,981 | 3/1992 | Dgasperi et al. | 221/3 |
| 5,413,245 | 5/1995 | Wright | 221/24 |
| 5,771,778 | 6/1998 | MacLean, IV | 221/24 |
| 5,785,204 | 7/1998 | Thompson et al. | 221/24 |
| 5,822,216 | 10/1998 | Satchell, Jr. et al. | 364/479.11 |
| 5,831,862 | 11/1998 | Hetrick et al. | 364/479.02 |
| 5,844,808 | 12/1998 | Konsmo et al. | 364/479.11 |

FOREIGN PATENT DOCUMENTS

| | | | |
|---|---|---|---|
| 681798 | 5/1993 | Switzerland | 221/3 |
| 07807 | 8/1989 | WIPO | 221/3 |

*Primary Examiner*—Christopher P. Ellis
*Assistant Examiner*—Khoi H. Tran
*Attorney, Agent, or Firm*—Sughrue, Mion, Zinn, Macpeak & Seas, PLLC

[57] ABSTRACT

A vending machine and distribution management system is provided which stores and sells merchandise to customers. The system includes a host computer for receiving actual sales data from the vending machine in order to track inventory and sales preferences, and to notify suppliers to restock the machine. The vending machine provides a variety of signals which are intended to entice potential customers to approach the machine and purchase merchandise. A questionnaire is provided for obtaining consumer preferences in the machine and the data is sent to the host computer for analyzing.

2 Claims, 13 Drawing Sheets

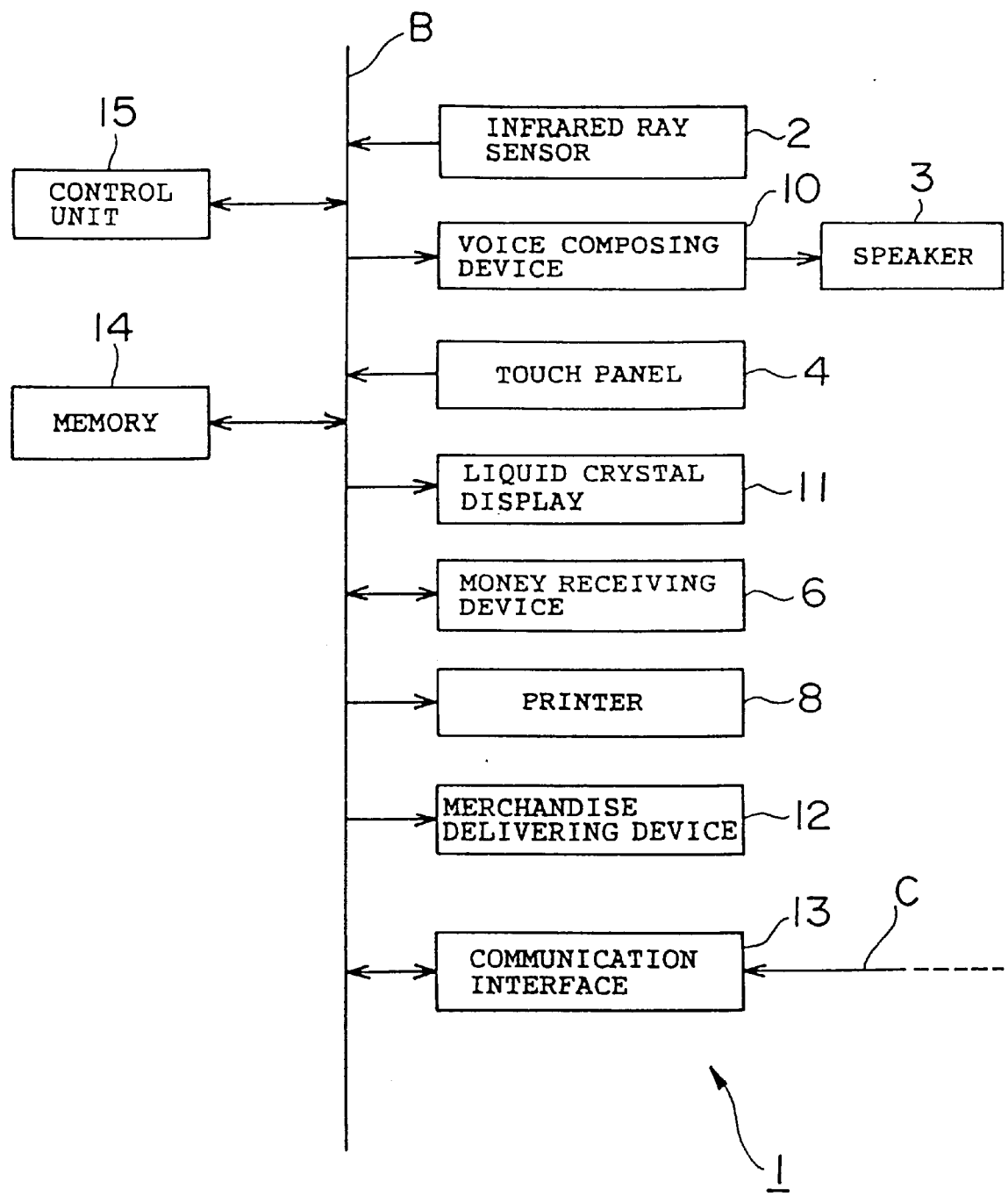

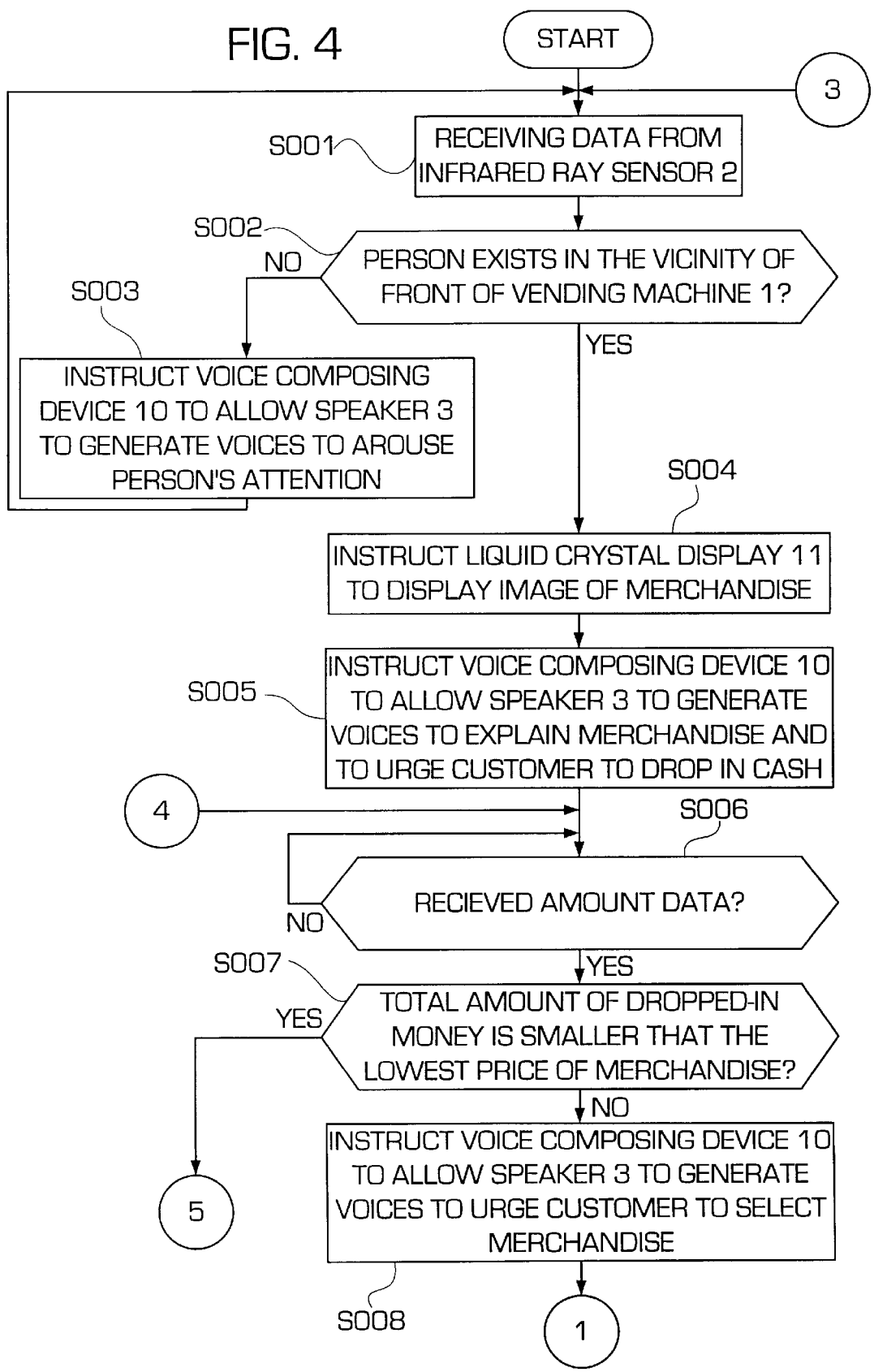

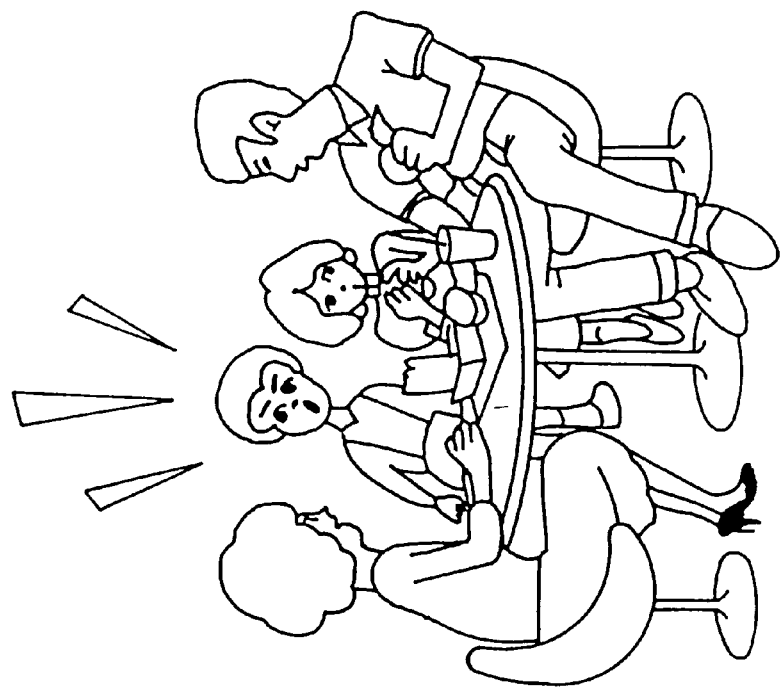
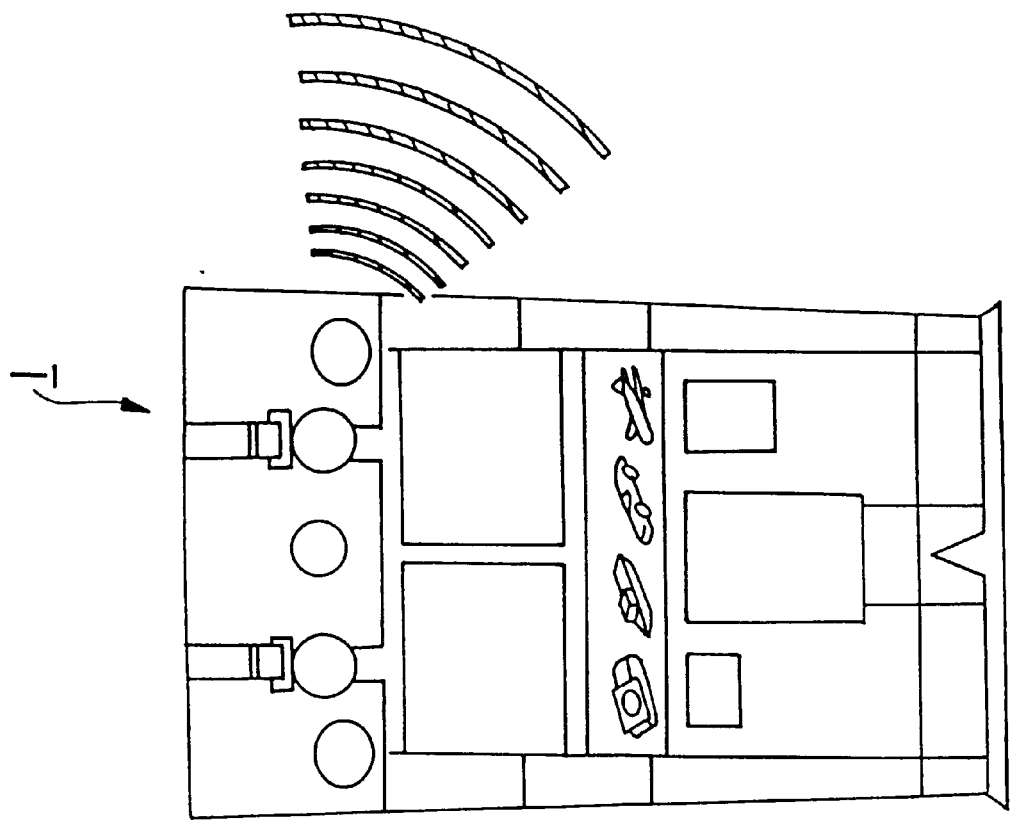
FIG. 7

FIG. 8
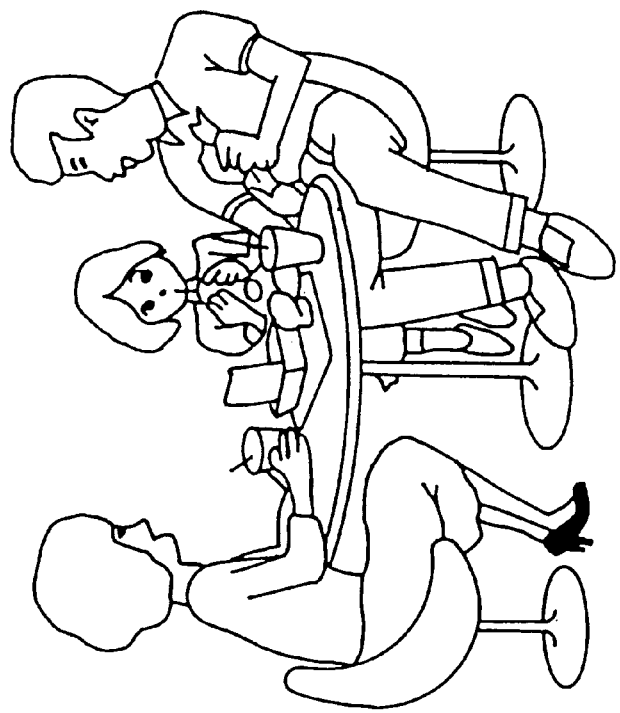
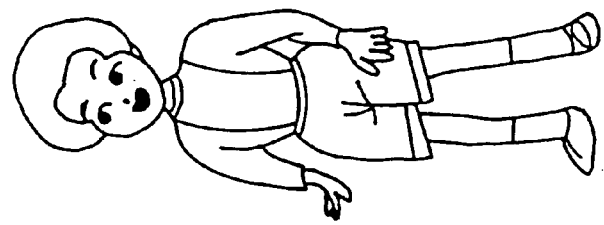
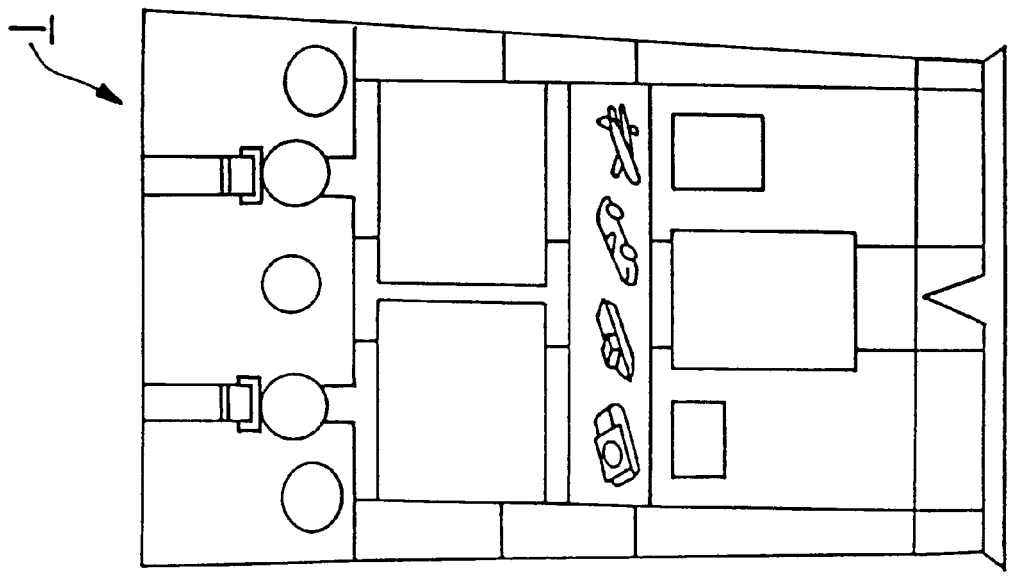

VENDING MACHINE AND DISTRIBUTION MANAGEMENT SYSTEM

BACKGROUND OF THE INVENTION

1. Field of the Invention

The present invention relates to a vending machine and distribution management system.

2. Description of the Related Art

In a conventional vending machine and distribution management system, a distributor periodically goes around the sites where vending machines are installed by a transportation vehicle loaded with all kinds of merchandise it deals in, to check the inventory on the sites and supplement merchandise.

However, according to such conventional vending machine and distribution management system, there have been drawbacks in that a distributor cannot supplement, procure and produce merchandise promptly because it cannot grasp the status of sales and inventory of a vending machine on a real time basis and, in addition, it has to go around vending machines with all the merchandise it deals in loaded on a transportation vehicle because it cannot get information in advance on which merchandise needs to be supplemented.

A first object of the present invention is to provide a vending machine enabling a distributor to grasp the status of sales and inventory on a real time basis in view of the above drawback of the prior art.

In addition, according to a conventional vending machine, a customer has to look at a sample of merchandise, etc. because he/she cannot recognize a merchandise to be sold by just looking at the appearance of the vending machine.

A second object of the present invention is to provide a vending machine enabling a customer to recognize a merchandise sold by just looking at the appearance of the vending machine in view of the above drawback of the prior art.

Further, with a conventional vending machine, a customer's purchase volition cannot be aroused unlike a manned counter sale.

A third object of the present invention is to provide a vending machine which can arouse purchase volition of a customer in view of the above drawback of the prior art.

Moreover, with a conventional vending machine, data to be the basis of marketing cannot be obtained because the taste of a customer purchasing a merchandise is unknown unlike a manned counter sale.

A fourth object of the present invention is to provide a vending machine enabling a distributor to investigate the taste of a customer purchasing a merchandise in view of the above drawback of the prior art.

Furthermore, with a conventional vending machine system, when a customer finds a merchandise he/she wishes to purchase is out of stock, he/she cannot get information on where a transportation vehicle for supplementing th merchandise runs.

A fifth object of the present invention is to provide a distribution management system enabling a customer to know the running position of a transportation vehicle loaded with supplemental merchandise in view of the above drawback of the prior art.

SUMMARY OF THE INVENTION

According to one aspect of the present invention, it is characterized in that a vending machine is provided with a merchandise storing means for storing merchandise, a money receiving means for receiving payment for the merchandise, a merchandise taking out means for taking out merchandise from the merchandise storing means and selling the merchandise on condition that payment is made to the money receiving means and a merchandise data transmitting means for transmitting data concerning the merchandise sold by the merchandise taking out means to a host computer.

According to the above-described aspect of the present invention, merchandise is stored by the merchandise storing means. Payment for the merchandise is received by the money reciving means. The merchandise is taken out from the merchandise storing means and sold by the merchandise taking out means on condition that payment is made to the money receiving means. Data concerning the merchandise sold by the merchandise taking out means is transmitted to the host computer by the merchandise data transmitting means. Thus, since data concerning merchandise sold to a customer is transmitted to the host computer, a distributor can grasp the status of merchandise sales and inventory of the vending machine on a real time basis.

In addition to each of the above mentioned means, a vending machine may be further provided with a merchandise displaying means for displaying a plurality of kinds of merchandise and a merchandise selecting means for inputting data for selecting merchandise among the plurality of kinds of merchandise. The merchandise storing means stores the plurality of kinds of merchandise and the merchandise taking out means takes out merchandise from the merchandise storing means and sells the merchandise selected by data input in the merchandise selecting means.

Here, the merchandise displaying means is a merchandise sample, a liquid crystal display, CRT (Cathode Ray Tube) and so on and the merchandise selecting means is a push button switch, a touch panel and so on.

According to the above structure, a plurality of kinds of merchandise are stored by the merchandise storing means. The plurality of kinds of merchandise is displayed by the merchandise displaying means. Payment for the merchandise is received by the money receiving means. Data for selecting merchandise from the plurality of kinds of merchandise is input by the merchandise selecting means. The merchandise selected by the data input in the merchandise selecting means is taken out from the merchandise storing means and sold by the merchandise taking out means. Data concerning the merchandise selected and sold by the data input in the merchandise selecting means is transmitted to the host computer by the merchandise data transmitting means. Thus, since the data concerning merchandise sold to a customer are transmitted to the host computer, a distributor can grasp the status of merchandise sales and inventory of the vending machine on a real time basis.

In addition, in the above structure, a main body may imitate the shape of the merchandise in order to attain the second object.

If the main body imitates the shape of merchandise, a customer can recognize merchandise by looking at the appearance of a vending machine.

Further, in order to attain the above mentioned third object, a vending machine may be provided with a customer detecting means for detecting that a customer approaches to the vicinity of the main body and a sales promotion means for transmitting a signal for arousing a customer's volition to approach to the vicinity of the main body to a customer when the customer detecting means does not detect the customer and for transmitting a signal for arousing a customer's volition to purchase merchandise to the customer when the customer detecting means detects the customer.

Here, the customer detecting means is an infrared ray sensor and so on. The sales promotion means is a voice generating means for generating an ordinary message when a customer does not approach to the vicinity of the main body and generating voices which arouse a customer's volition to purchase when the customer approaches, a lamp which repeats turning on and off and an image displaying means and so on.

According to the above structure, a customer around the main body is detected by the customer detecting means. When the customer detecting means does not detect the customer, the signal arousing a customer's volition to approach to the vicinity of the main body is transmitted to the customer and when the customer detecting means detects the customer, the signal arousing a customer's volition to purchase merchandise is transmitted to the customer. Thus, since a customer's volition to purchase is aroused, sales by the vending machine can be increased.

Moreover, in order to attain the above mentioned first through third objects, a vending machine may be further provided with a customer detecting means for detecting that a customer approaches to the vicinity of the main body and a sales promotion means for transmitting a signal arousing a customer's volition to approach to the vicinity of the main body when the customer detecting means does not detect the customer and for transmitting a signal arousing a customer's volition to purchase merchandise when the customer detecting means detects the customer.

In addition, in order to attain the above mentioned first through fourth objects, a vending machines may be further provided with a questionnaire displaying means for displaying contents of a questionnaire, a questionnaire answer inputting means for inputting data answering the questionnaire and a questionnaire answer data transmitting means for transmitting data answering the questionnaire input by the questionnaire answer inputting means to a host computer.

Here, the questionnaire displaying means is paper, a liquid crystal display, CRT and so on and the questionnaire answer inputting means is a push button switch, a touch panel and so on.

According to another aspect of the present invention, contents of a questionnaire are displayed by a questionnaire displaying means. Data answering the questionnaire is input by a questionnaire answer inputting means. The data answering the questionnaire is transmitted to a host computer by a questionnaire answer data transmitting means. Thus, since the data answering a questionnaire is transmitted to a host computer, a distributor can obtain information on the taste of a customer.

Further, in order to attain the above mentioned first through third objects, in a distribution management system comprising a plurality of vending machines installed in a plurality of sites respectively and a host computer connected to the vending machines respectively via a communication line, the host computer is provided with a merchandise data receiving means for receiving data concerning the merchandise and a merchandise managing means for adding up data concerning the merchandise and managing distribution of merchandise.

In the above structure, data concerning merchandise is received by the merchandise data receiving means and management of merchandise distribution based on added up data concerning the merchandise is conducted by the merchandise managing means. Thus, since the data concerning merchandise purchased by a customer is added up in the host computer, a distributor can conduct merchandise management of the vending machine on a real time basis.

Moreover, according to still another aspect of the present invention, it is characterized in that, in order to attain the above mentioned first through fourth objects, in a distribution management system comprising a plurality of vending machines installed in a plurality of sites respectively and a host computer connected with the vending machines respectively via a communication line, the vending machine is provided with a merchandise storing means for storing merchandise, a money receiving means for receiving payment for the merchandise, a merchandise taking out means for taking out a merchandise from the merchandise storing means and selling the merchandise on condition that payment to the money receiving means is made, a merchandise data transmitting means for transmitting data concerning the merchandise sold by the merchandise taking out means to a host computer, a questionnaire displaying means for displaying contents of a questionnaire, a questionnaire answer inputting means for inputting data answering the questionnaire, and a questionnaire answer data transmitting means for transmitting the data answering the questionnaire input by the questionnaire answer inputting means to the host computer, and that the host computer is provided with a merchandise data receiving means for receiving data concerning the merchandise, a merchandise managing means for managing distribution of merchandise by adding up data concerning the merchandise, a questionnaire answer data receiving means for receiving data answering the questionnaire, and a questionnaire answer data adding up means for preparing marketing materials by adding up the data answering the questionnaire.

Here, the host computer may be provided with a questionnaire transmitting means for transmitting contents of the questionnaire to the vending machine, the vending machine may be provided with a questionnaire receiving means for receiving contents of the questionnaire from the host computer, and the questionnaire displaying means may display contents of the questionnaire received by the questionnaire receiving means.

In addition, the vending machine may be provided with a merchandise image data receiving means for receiving image data of the merchandise from the host computer and a merchandise image data displaying means for displaying the image data.

According to still another aspect of the present invention, it is charcterized in that, in order to attain the above mentioned first through fifth objects, in a distribution management system having a plurality of vending machines installed in a plurality of sites respectively and a host computer connected with the vending machines by a communication line respectively and managing travelling of a transportation vehicle transporting merchandise to the vending machines, the transportation vehicle is provided with a running position data acquiring means for acquiring data of its own running position, and a running position data transmitting means for transmitting the data of running position to the host computer, the vending machine is provided with a merchandise storing means for storing the merchandise, a money receiving means for receiving payment for the merchandise, a merchandise taking out means for taking out a merchandise from the merchandise storing means and selling the merchandise on condition that payment to the money receiving means is made, a merchandise data transmitting means for transmitting data concerning the merchandise sold by the merchandise taking out means to a host computer, a running position data receiving means for receiving data of the running position from the host computer, and a displaying means for showing the position of the transportation vehicle by corresponding it to data of the running position, and that the host computer is provided with a merchandise data receiving means for receiving data concerning the merchandise, a merchandise managing means for managing distribution of merchandise by adding up data concerning the merchandise, a running position data receiving means for receiving the data of running position from the transportation vehicle, and a running position data transmitting means for transmitting the data of running position to the vending machine.

Here, the running position data acquiring means is GPS (Global Positioning System) and so on and the displaying means is LED (Light Emitting Diode), a liquid crystal display, CRT and so on.

According to the third aspect of the present invention, running position data of the transportation vehicle is acquired by the running position data acquiring means and the running position data is transmitted to the host computer by the running position data transmitting means. The data of the running position of the transportation vehicle is received from the transportation vehicle by a running position data receiving means, and the data of running position is transmitted to the vending machine by the running position data transmitting means in the host computer. In the vending machine, the data of running position is received from the host computer by the running position data receiving means and the position of the transportation vehicle is displayed by displaying means. Thus, since the running position of the transportation vehicle is displayed, a customer can obtain information on where the transportation vehicle runs.

In addition, in the third aspect of the present invention, in order to attain the first, fourth and fifth objects, the vending machine may be provided with a questionnaire displaying means for displaying contents of a questionnaire, a questionnaire answer inputting means for inputting data answering the questionnaire, a questionnaire answer data transmitting means for transmitting data answering the questionnaire input by the questionnaire answer inputting means, and the host computer may be provided with a questionnaire answer data receiving means for receiving data answering the questionnaire and a questionnaire answer data adding up means for preparing marketing materials by adding up the data answering the questionnaire.

It should be noted, each of the above mentioned aspects and structures may be combined in various ways as possible without limitation.

BRIEF DESCRIPTION OF THE DRAWINGS

In the accompanying drawings:

FIG. 3 and 3a are a block diagrams showing a structure inside of the vending machine of FIG. 1;

FIG. 4 is a flow chart of a control processing program to be executed in a control unit of FIG. 3;

FIG. 7 is a pictorial view showing a situation where voices are generated from a speaker of FIG. 3;

FIG. 8 is a pictorial view showing a situation where a customer approaches to the vicinity of a vending machine;

DETAILED DESCRIPTION OF THE PREFERRED EMBODIMENTS

An explanation will be given of embodiments of the present invention in reference to FIGS. 1 through 12.

Figure 1:
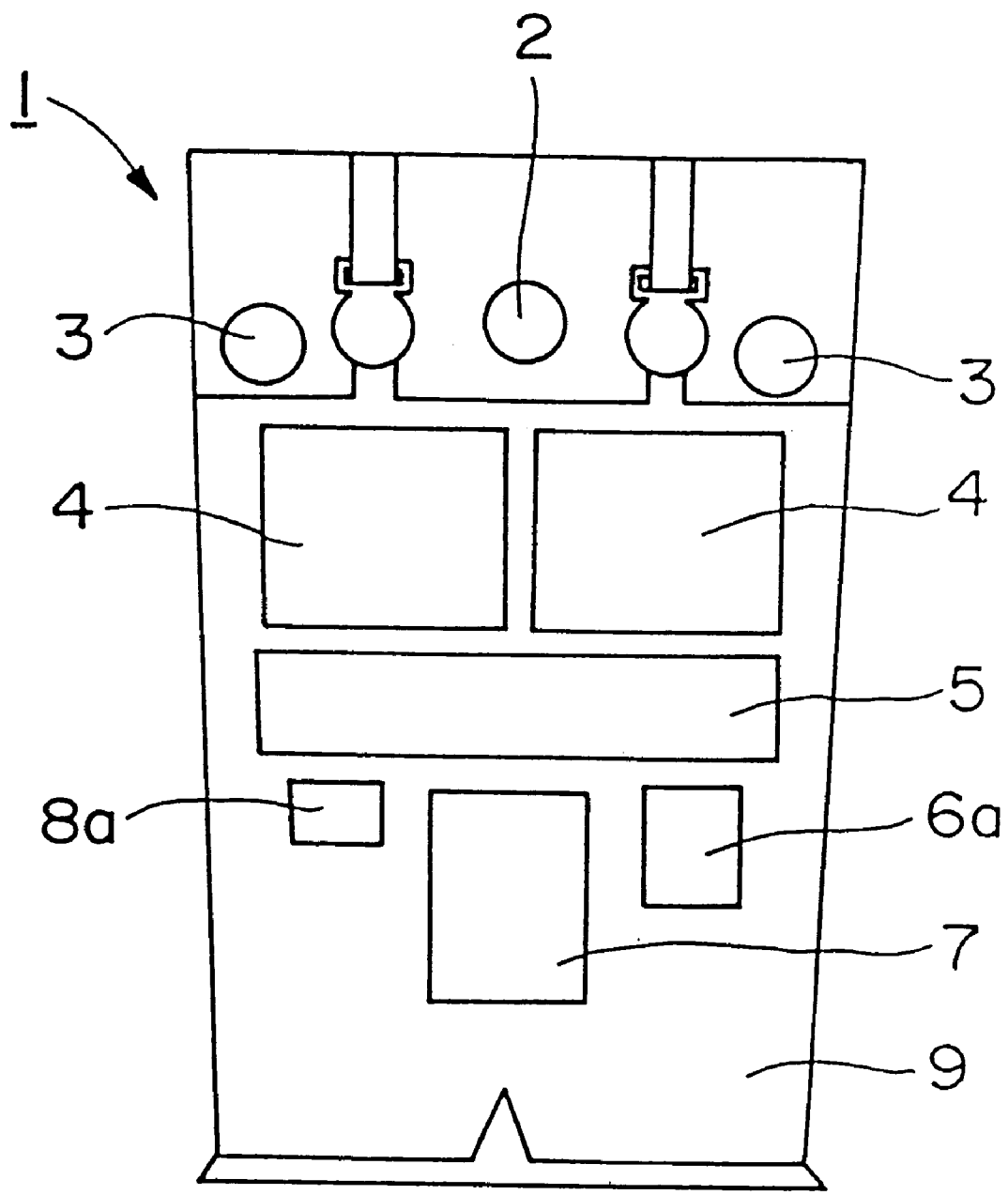
FIG. 1 is a front view of the vending machine according to an embodiment of the present invention.
Figure 2:
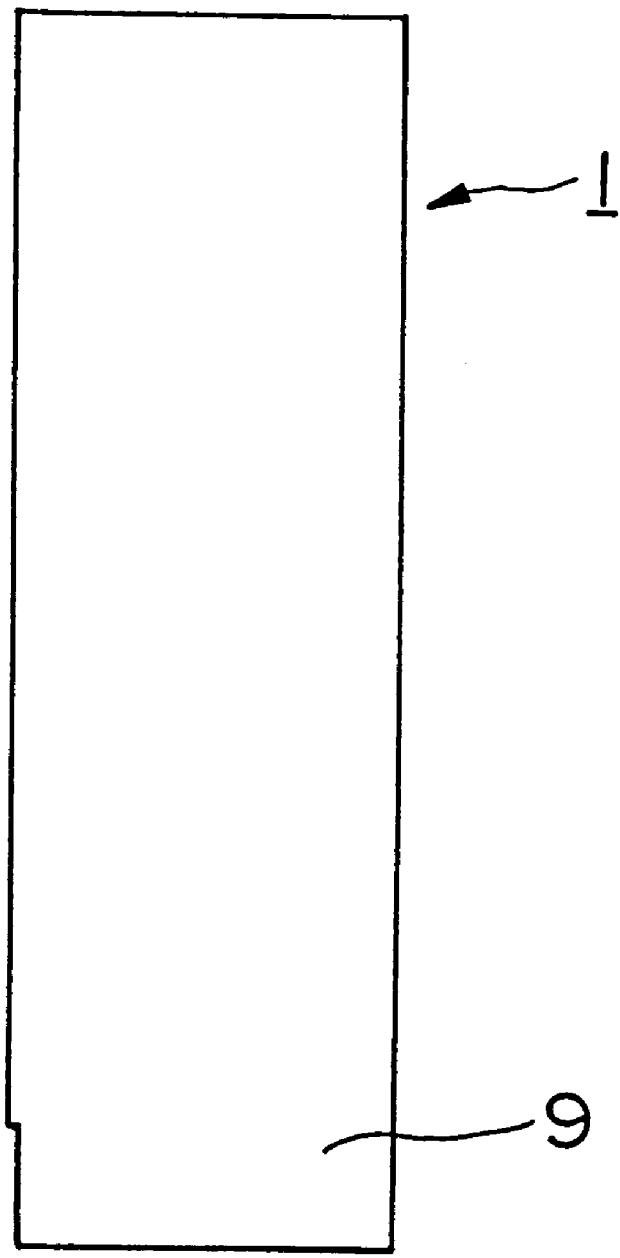
FIG. 2 is a left side view of the vending machine of FIG. 1.
Figure 3A:
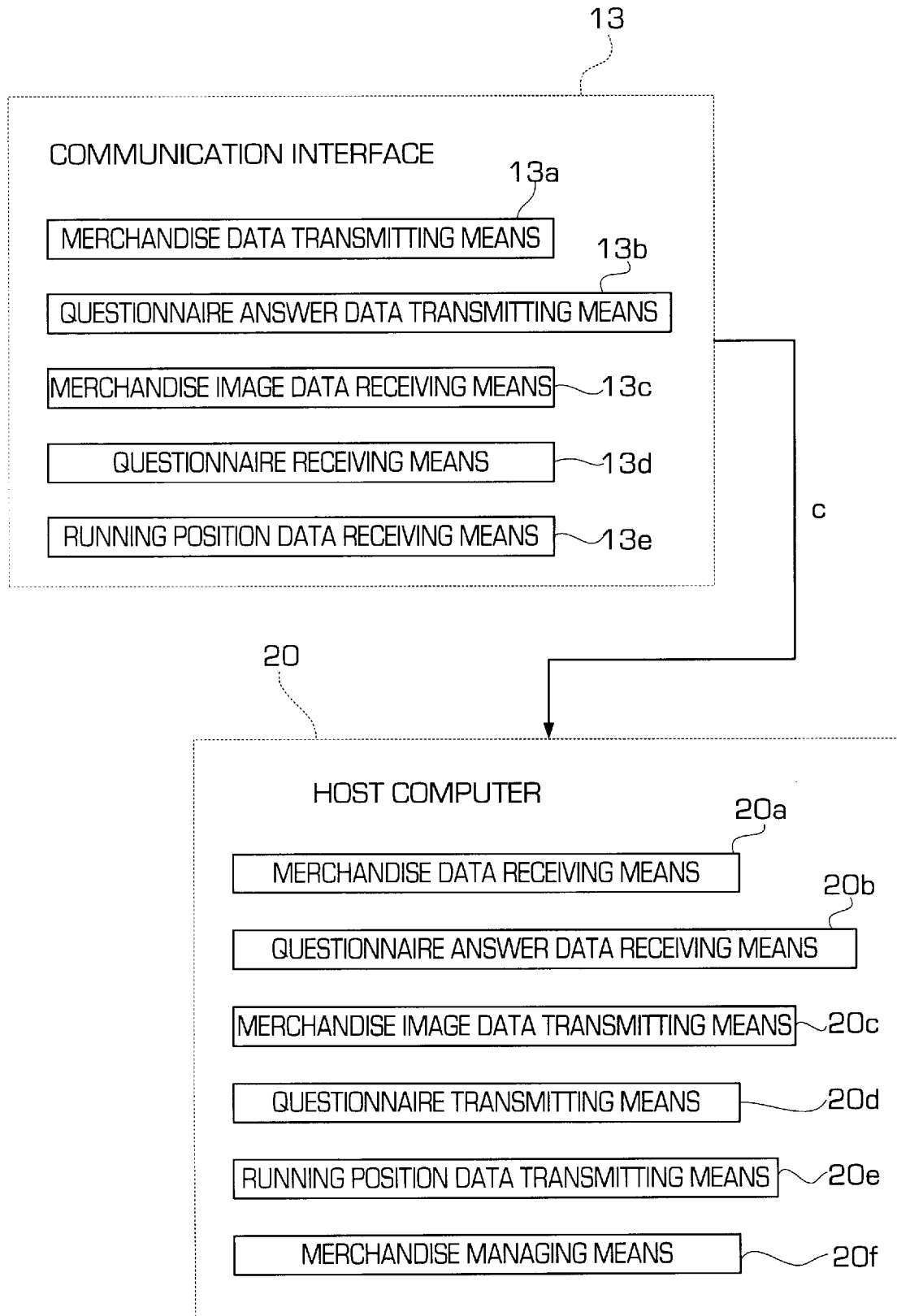

FIG. 1 is a front view of a vending machine 1 according to an embodiment and FIG. 2 is a side view showing a view looked at from the left side of FIG. 1. The vending machine 1 according to the embodiment is for selling jeans for children. The vending machine 1 has a structure in which machine construction and circuitry are covered by a housing 9.

On the front surface of the housing 9, an infrared ray sensor 2, a speaker 3, a touch panel 4, a money delivering opening 6a and a printout opening 8a are provided respectively. In addition, on the front surface of the housing 9, a pop space 5 and a merchandise taking out opening 7 are formed respectively. Further, the shape of the housing 9 looked at from the front direction is the one designed imitating jeans for children which are merchandise sold by the vending machine 1. The housing 9 corresponds to a main body according to the present invention. The housing 9 may be any shape other than jeans for children as far as it is in the shape of merchandise which is sold by the vending machine such as a hamburger, a can of soft drinks, ice cream, popcorn and so on.

In FIG. 1, the infrared ray sensor 2 is a device for detecting an existence of a man in the vicinity of the vending machine 1. The infrared ray sensor 2 corresponds to a customer detecting means.

The speaker 3 is an apparatus for generating voices for calling a customer to the vicinity of the vending machine 1 such as "Come and busy", voices for arousing a customer's volition to purchase merchandise such as "Do you want a hamburger?" or voices for informing procedures and so on for purchasing merchandise such as "Please drop your money in the slot".

The touch panel 4 is an inputting device for a customer to input instruction data such as designation of merchandise. The surface of the touch panel 4 to be touched is transparent. The touch panel 4 corresponds to a merchandise selecting means and a questionnaire answer inputting means.

The pop space 5 is a place for putting a poster of merchandise and so on.

The money delivering opening 6a consists of a slot for allowing a money receiving device 6 installed inside the housing 9 to receive payment for merchandise and a payment opening for giving change from the money receiving device 6.

The merchandise taking out opening 7 is an opening for a customer to take out purchased merchandise.

The printout opening 8a is an opening for discharging output paper of a printer 8 installed within the housing 9.

FIG. 3 is a block diagram showing construction of an electric circuit arrangement and devices built in the housing 9. In FIG. 3, the inside of the vending machine 1 consists of the infrared ray sensor 2 connected by a bus B to each other, a voice composing device 10, the touch panel 4, a liquid crystal display 11, the money receiving device 6, the printer 8, a merchandise delivering device 12, a communication interface 13, a memory 14 and a control unit 15.

The voice composing device 10 is a device for composing voice signals which allow the speaker 3 to generate voices.

The liquid crystal display 11 is a device for displaying an image of merchandise, an image of contents of a questionnaire and an image of a map showing a running position of a transportation vehicle loaded with supplementary merchandise. The size of an image display screen of the liquid crystal display 11 substantially equals to the size of the surface to be touched on the touch panel 4. In addition, the liquid crystal display 11 is provided inside the vending machine 1 so that the entire surface of the image display screen is overlapped and covered by the surface to be touched on the touch panel 4. The liquid crystal display 11 corresponds to a merchandise displaying means, a questionnaire displaying means and a merchandise image data displaying means. Further, the speaker 3, the voice composing device 10 and the liquid crystal display 11 correspond to a sales promotion means.

The money receiving device 6 detects cash dropped in from the money delivering opening 6a and transmits data of the amount to the control unit 15 and at the same time stores the cash. In addition, when the amount of money dropped in is more than a purchase amount, it pays back cash corresponding to the difference as the change to the money delivering opening 6a upon receiving data of the difference from the control unit 15. Further, when a merchandise selected by a customer is out of stock, it pays back cash corresponding to the amount of dropped-in money to the money delivering opening 6a by an instruction from the control unit 15. The money receiving device 6 corresponds to a money receiving means.

The printer 8 is an apparatus for printing a discount coupon for drinks and discharging it to the printout opening 8a.

The merchandise delivering device 12 is a device for delivering merchandise stored in a merchandise storing unit inside the housing 9 to the merchandise taking out opening 7. The merchandise delivering device 12 corresponds to a merchandise taking out means.

The communication interface 13 (see FIG. 3a) is a device for transmitting and receiving data via a host computer 20 and a communication line C. The communication interface 13 corresponds to a merchandise data transmitting means 13a, a questionnaire answer data transmitting means 13b, a merchandise image data receiving means 13c, a questionnaire receiving means 13d and a running position data receiving means 13e.

Corresponding to those means 13a, 13b, 13c, 13d and 13e, the host computer 20 includes merchandise data receiving means 20a, questionnaire answer data receiving means 20b, merchandise image data transmitting means 20c, questionnaire transmitting means 20d and running position data transmitting means 20e. The host computer 20 includes merchandise managing means 20f for adding up concerning the merchandise and managing distribution of merchandise.

The memory 14 is a memory to be used for operation of the control unit 15.

The control unit 15 consists, for example, of CPU (Central Processing Unit), instructs the voice composing device 10 to compose a voice signal to allow the speaker 3 to generate voices, instructs the liquid crystal display 11 to display images such as a merchandise image and an image of contents of a questionnaire, instructs the money receiving device 6 to pay cash, instructs the printer 8 to issue a discount coupon for drinks, instructs the merchandise delivering device 12 to deliver merchandise to the merchandise taking out opening 7, and instructs the communication interface 13 to transmit merchandise sales status data and so on to the host computer.

In addition, the control unit 15 receives data on whether a man exists in the vicinity of the vending machine 1 from the infrared ray sensor 2, receives input data such as an instruction for selecting a merchandise by a customer and an answer to a questionnaire from the touch panel 4, and receives data on the amount of money dropped in by the customer from the money receiving device 6. Further, the control unit 15 receives, via the communication interface 13, data of a running position of a transportation vehicle loaded with supplementary merchandise, data of contents of a questionnaire and image data of merchandise from the host computer. The control unit 15 generates image data of a map showing the running position of the transportation vehicle by corresponding it to the running position data and displays the map image on the liquid crystal display 11. Similarly, the control unit 15 displays contents of the questionnaire and an image of merchandise on the liquid crystal display 11.

The transportation vehicle is provided with GPS (Global Positioning System) as a running position data acquiring means for acquiring data of its own running position. GPS calculates a running position using a signal from the GPS satellite. In addition, the transportation vehicle is provided with a running position data transmitter as a running position data transmitting means for transmitting the data of the running position detected by GPS to the host computer, and the data transmitted from the data transmitter is received by a receiving device connected to the computer.

Figure 5:
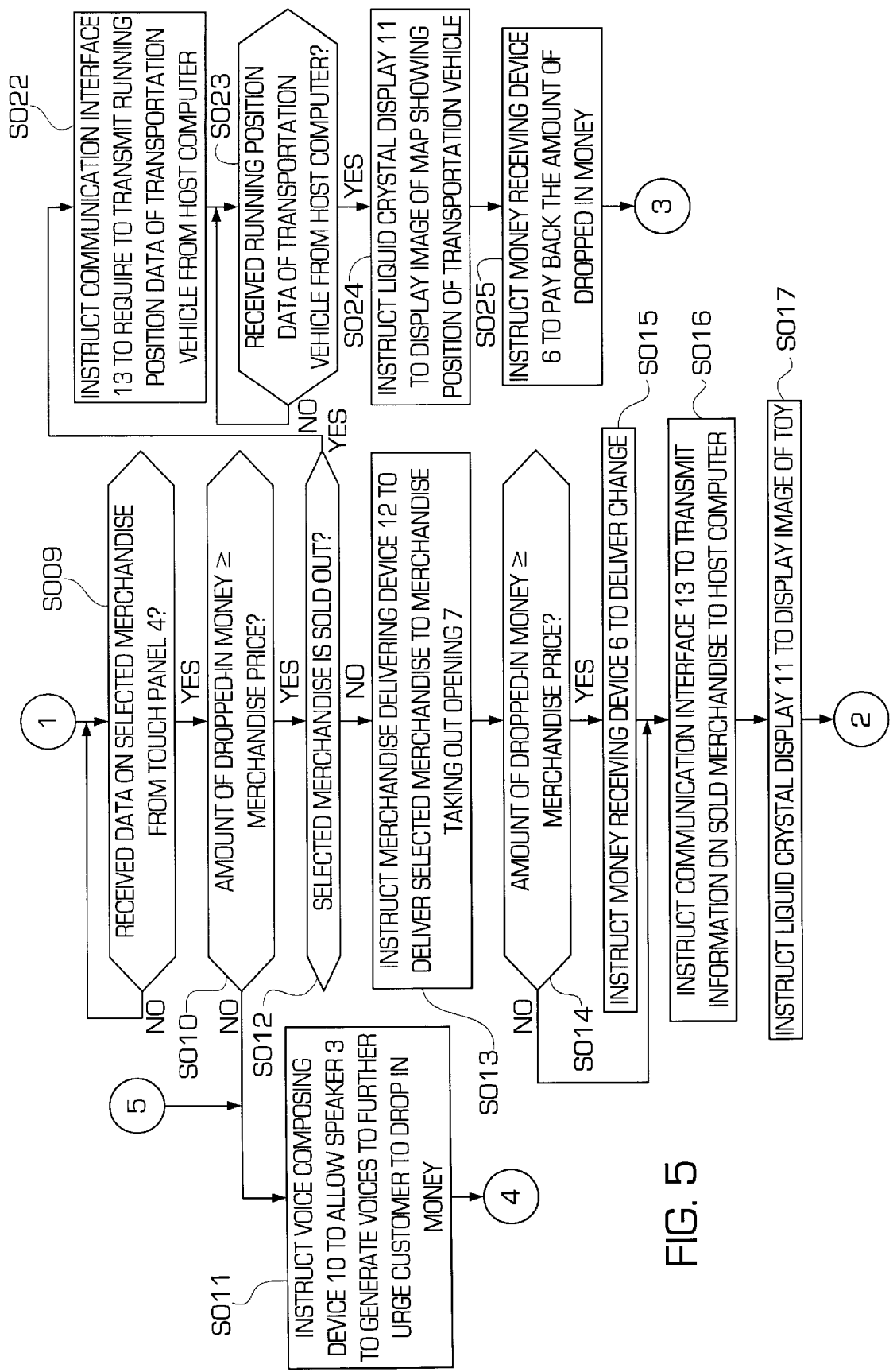
FIG. 5 is a flow chart of a control processing program to be executed in a control unit of FIG. 3.
Figure 6:
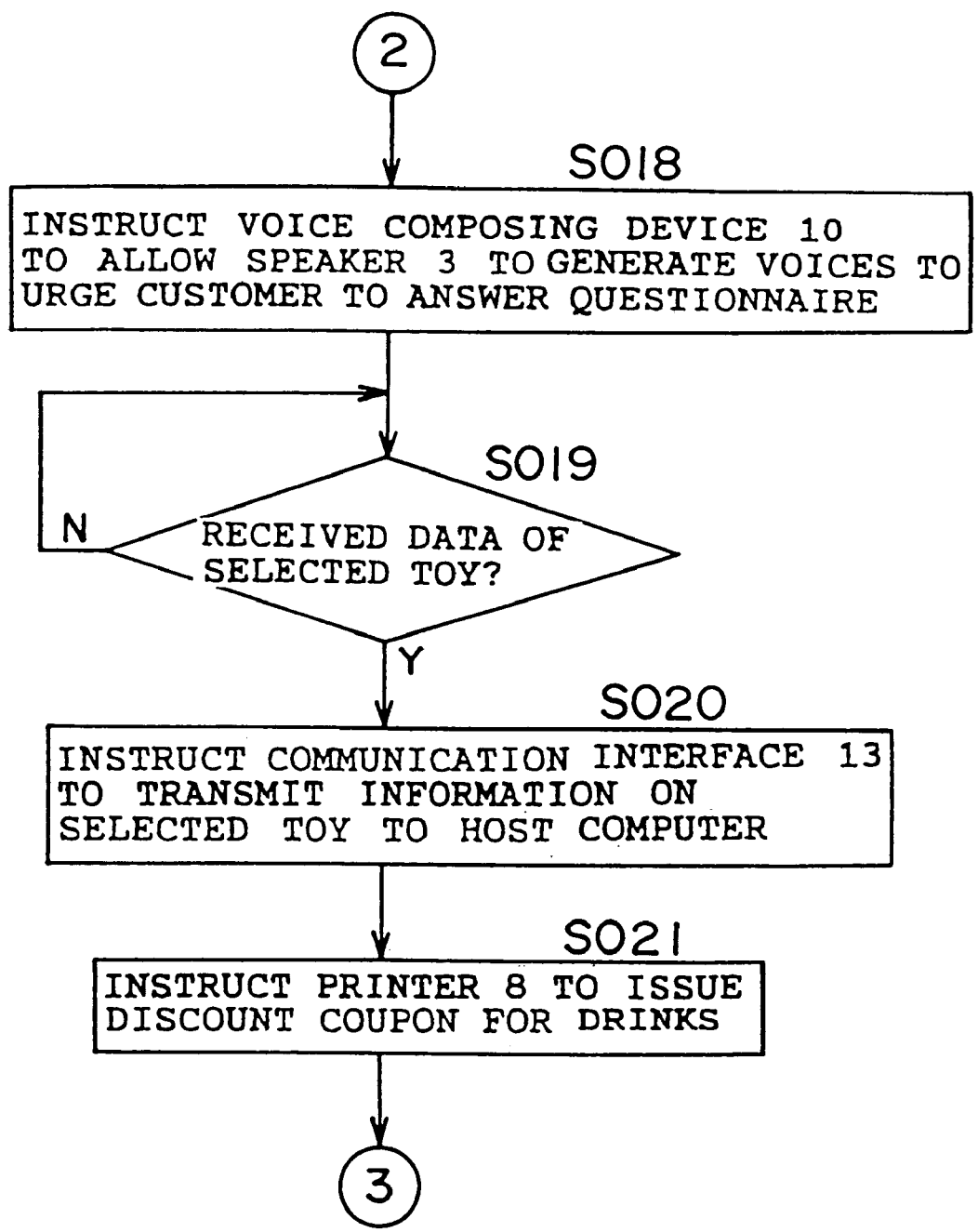
FIG. 6 is a flow chart of a control processing program to be executed in a control unit of FIG. 3.

Next, an explanation will be given of operation of the embodiment of the present invention in reference to the flow charts in FIGS. 4 through 6.

First, the control unit 15 receives data from the infrared ray sensor 2 (S001) and checks whether a man exists in the vicinity of the vending machine 1 or not (S002.). If a man exists in the vicinity of the vending machine 1, processing is moved to S004. If not, the control unit 15 instructs the voice composing device 10 to generate from the speaker 3 voices (such as voices "How about jeans?") for arousing a person's attention and calling him/her to the vicinity of the vending machine 1 (S003), and returns processing to S001. FIG. 7 is a pictorial view showing a situation where voices for calling a man to the vicinity of the vending machine 1 are generated from the speaker 3.

Figure 9:
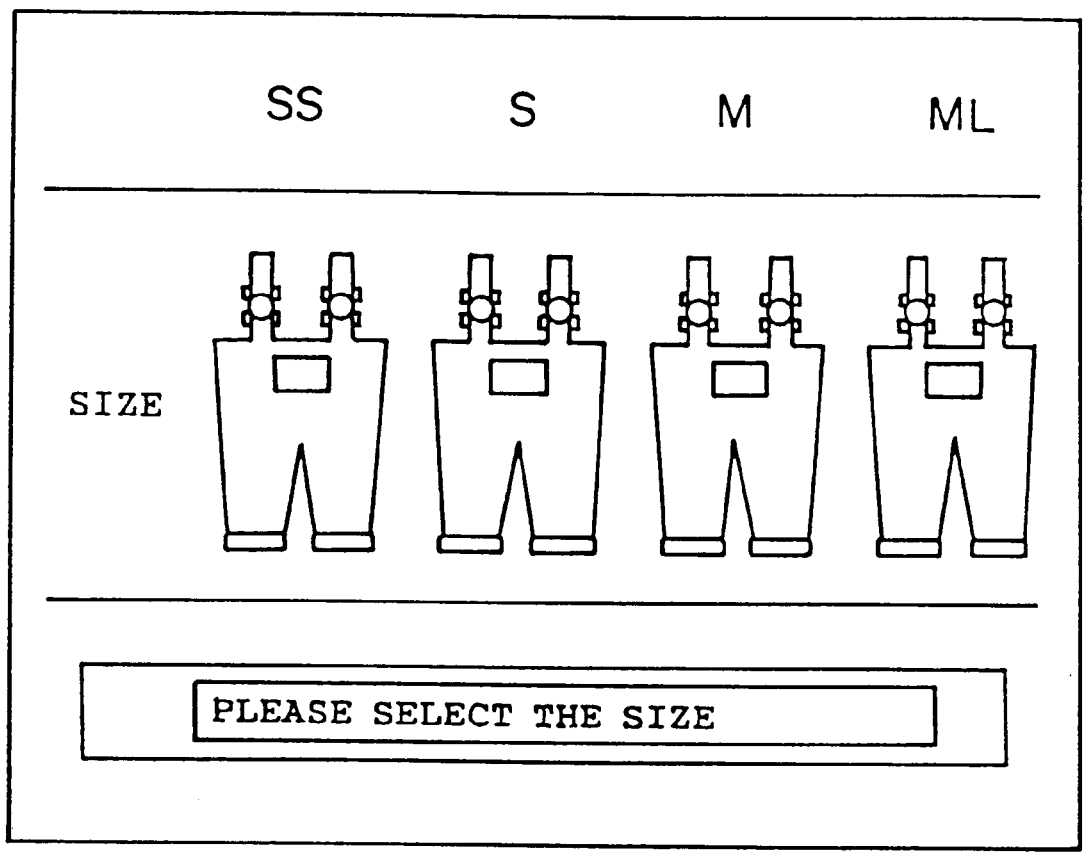
FIG. 9 is an example of merchandise to be sold displayed on a liquid crystal display of FIG. 3.

When a customer exists in the vicinity of or approaches to the vending machine 1, the control unit 15 instructs the liquid crystal display 11 to display the image of each merchandise for sales promotion to the customer (S004). FIG. 8 is a pictorial view showing the situation where a customer approaches to the vicinity of the vending machine 1. In addition, FIG. 9 is an example of an image of merchandise displayed on the liquid crystal display 11.

Next, the control unit 15 instructs the voice composing device 10 to allow the speaker 3 to generate voices which explain each merchandise and voices which urge a customer to drop in cash (S005).

Then, the control unit 15 waits to be informed of data showing the amount of money dropped in from the money receiving device 6 (S006).

Upon receiving the data showing the amount of money dropped in, the control unit 15 compares the total amount dropped in with the lowest price of merchandise (S007). Then, if the total amount of money dropped in is smaller, the control section 15 moves the processing to S011, instructs the voice composing device 10 to allow the speaker 3 to generate voices which urge a customer to drop in more money, and returns the processing to S006. On the other hand, if the total amount of money dropped in is larger than the lowest price of merchandise, it moves the processing to S008.

In S008, the control unit 15 instructs the voice composing device 10 to allow the speaker 3 to generate voices which urge a customer to select merchandise.

Then, the control unit 15 waits to be informed of data showing the selected merchandise from the touch panel 4 (S009). At this time, a customer can select a merchandise by touching a part where a part of surface to be touched on the touch panel 4 overlaps a part of an image display screeen of the liquid crystal display 11 where an image of desired merchandise is displayed.

Upon receiving data showing selected merchandise from the touch panel 4, the control unit 15 compares the total amount of dropped-in money with the price of the selected merchandise (S010). Then, if the total amount of dropped-in money is larger than the price of the selected merchandise, the control unit 15 moves the processing to S012, or if not, the control unit 15 instructs the voice composing device 10 to allow the speaker 3 to generate voices which urge a customer to drop in more money (S011) and returns the processing to S006.

In S012, the control unit 15 checks whether the selected merchandise is sold out or not, and if it is not sold out, the control unit 15 moves the processing to S013, or if it is sold out, it moves the processing to S022.

When selected merchandise is not sold out, the control unit 15 instructs the merchandise delivering device 12 to deliver the selected merchandise from the merchandise storing unit to the merchandise taking out opening 7 (S013).

Then, the control unit 15 compares the amount of dropped-in money with the price of merchandise and, if the amount of dropped-in money is larger than the price of merchandise, the processing is moved to S015, or if not, the processing is moved to S016 (S014).

In S015, the control unit 15 instructs the money receiving device 6 to deliver the change corresponding to the difference between the amount of dropped-in money and the price of merchandise, and moves the processing to S016.

The control unit 15 instructs the communication interface 13 to transmit data of merchandise completed to be sold as above to the host computer (not shown) (S016). The host computer can grasp the status of sales and inventory at the vending machine 1 based on the data and serve to make planning for supplementation of merchandise, procurement and production. For example, when a certain merchandise is sold out at the vending machine 1, the host computer immediately issues a warning to an operator to dispatch a transportation vehicle for supplementing the merchandise.

Figure 10:
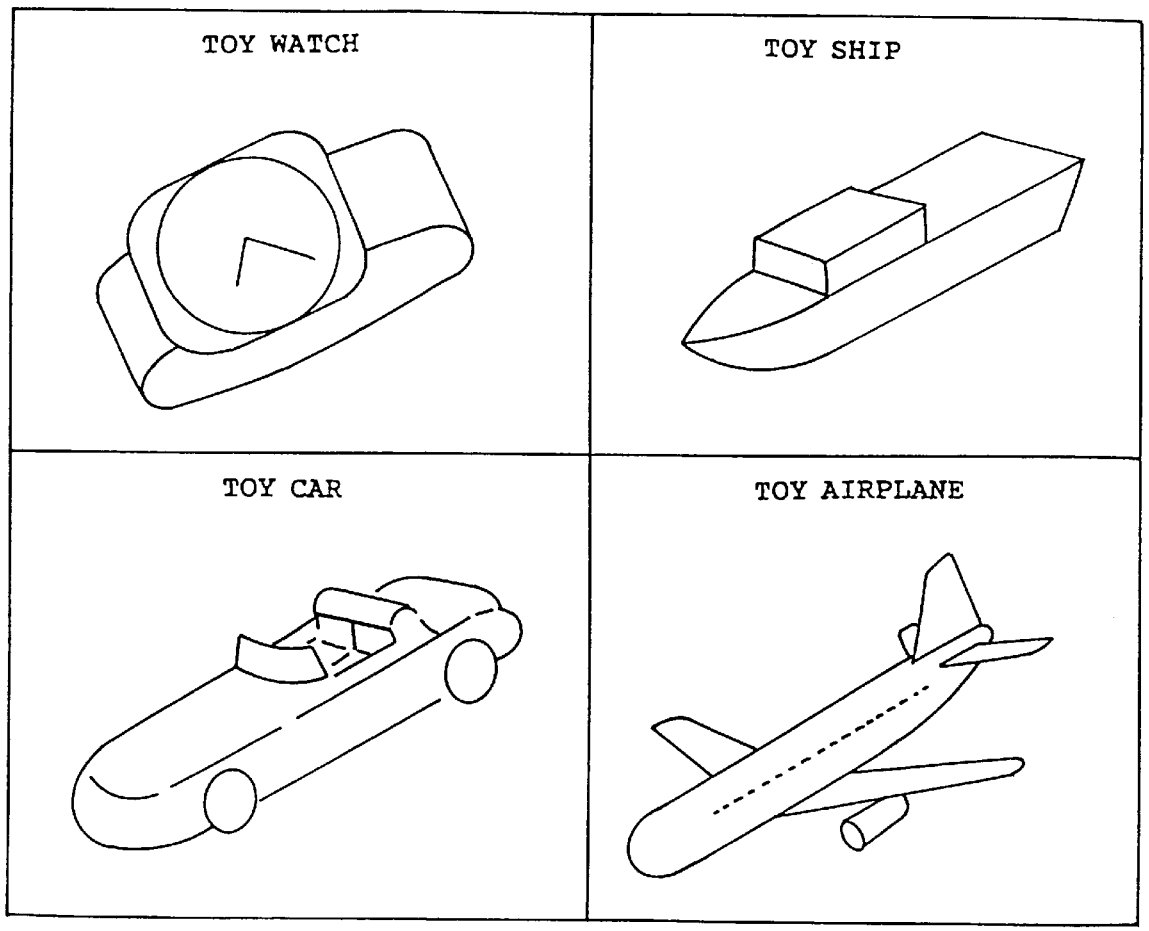
FIG. 10 is an example of images of toys which are objects of a questionnaire to be displayed on a liquid crystal display of FIG. 3.

Next, the control unit 15 instructs the liquid crystal display 11 to display an image of a toy which is an object of a questionnaire in order to carry out a questionnaire for investigating the taste of a customer who has purchased merchandise (S017). FIG. 10 is an example of an image of a toy which is an object of questionnaire.

Then, the control unit 15 instructs the voice composing device 10 to allow the speaker 3 to generate voices to urge a customer to select a desired toy and answer a questionnaire (S018) and waits to be informed of data showing the selected toy from the touch panel 4 (S019). At this time, the customer can select a toy by touching a part where a part of the surface to be touched on the touch panel 4 overlaps a part of an image display screen of the liquid crystal display 11 where an image of the desired toy is displayed.

Figure 11:
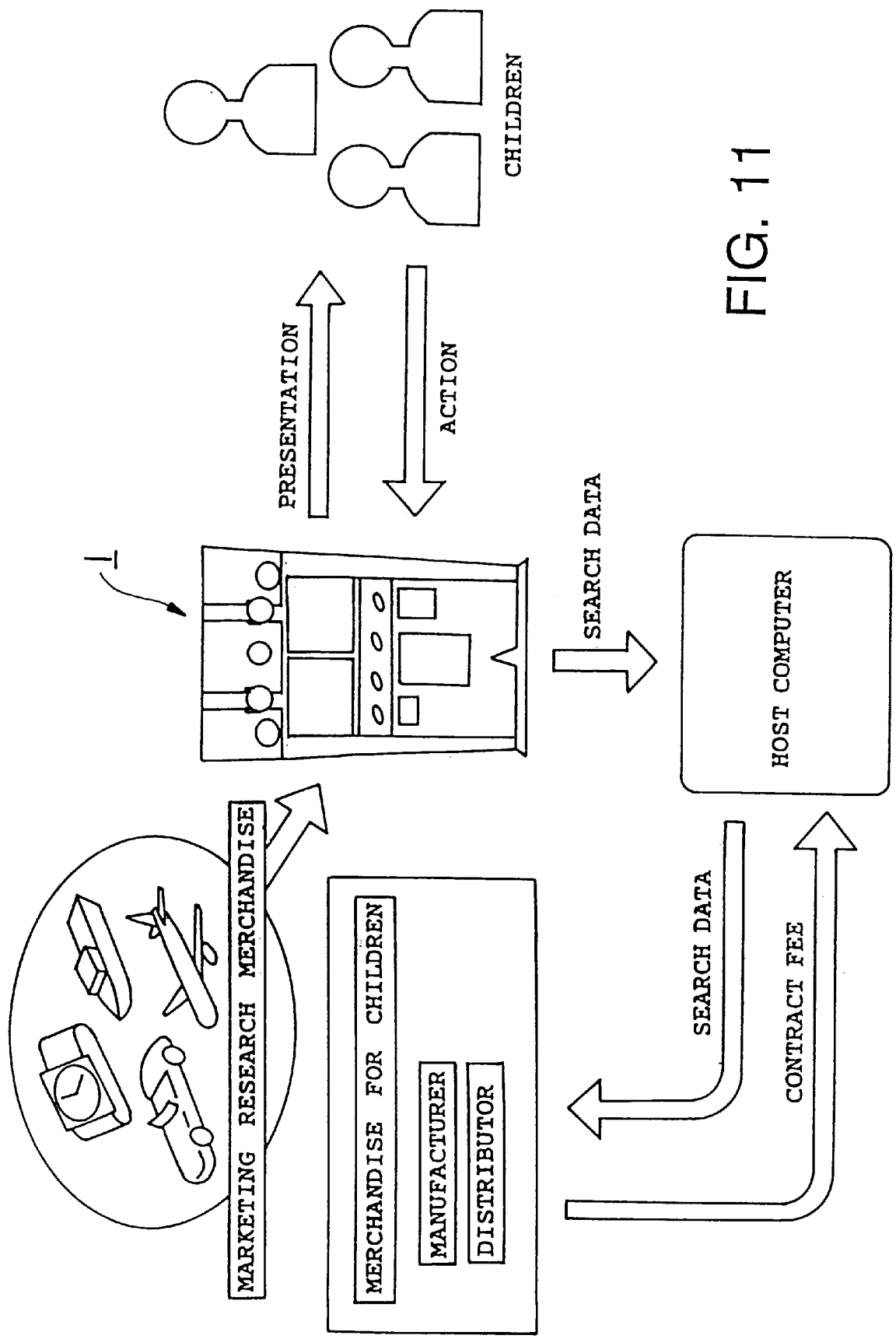
FIG. 11 is an illustration showing flow of contens of questionnare, answer thereto, and consideration, etc.

Upon receiving data showing the selected toy from the touch panel 4, the control unit 15 instructs the communication interface 13 to transmit the data to the host computer (S020). FIG. 11 is a conceptual drawing showing a situation where an image of merchandise and contents of a questionnaire are sent from a manufacturer and a distributor to the vending machine 1, a situation where an answer to the questionnaire is transferred to the manufacturer and the distributor, and a situation where a consideration to be made for answer to the questionnaire is given by the manufacturer and the distributor.

Then, the control unit 15 instructs the printer 8 to issue a discount coupon for drinks as a reward for answering the questionnaire (S021) and returns the processing to S001.

On the other hand, in S012, when determining that the selected merchandise is sold out, the control unit 15 instructs the communication interface 13 to require transmission of running position data of a transportation vehicle loaded with the merchandise from the host computer (S022) and waits to receive the data (S023). The running position data acquired by GPS loaded on the transportation vehicle is transmitted to the host computer from the transportation vehicle by wireless communication and so on. Upon receiving a request from the control unit 15 via the communication interface 13 and a communication line C, the host computer transmits the running position data to the control unit 15 via the communication line C and the communication interface 13.

Figure 12:
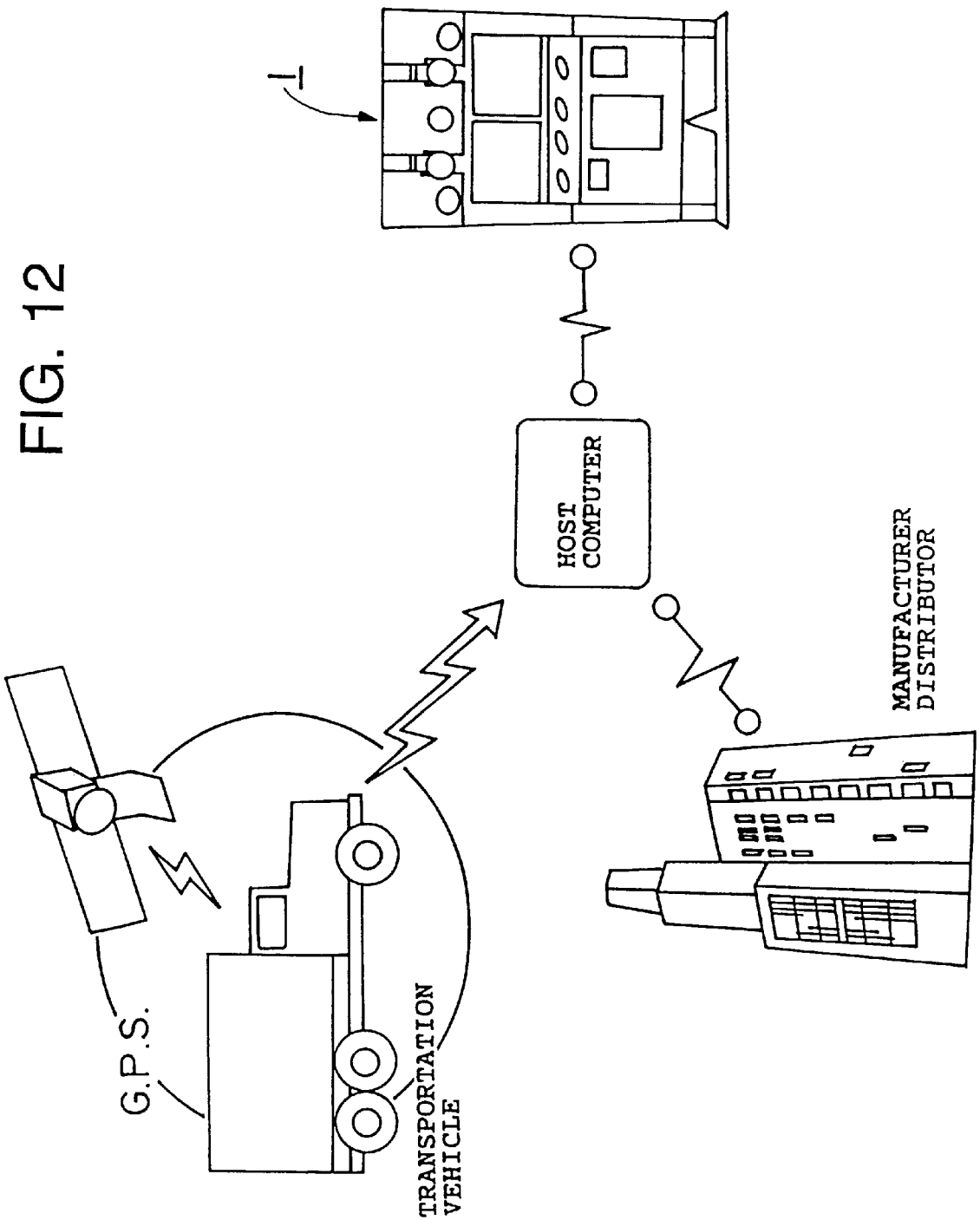
FIG. 12 is a pictorial view showing a situation where data of running position of a transportation vehicle is sent to the vending machine of FIG. 3.

Upon receiving the running position data from the host computer, the control unit 15 generates image data of a map showing the position of the transportation vehicle corresponding to the data and instructs the liquid crystal display 11 to display the image (S024). A customer can obtain information on where the transportation vehicle loaded with supplementary merchandise runs, and as a result, he/she can estimate approximate time when the transportation vehicle arrives. FIG. 12 is a pictorial view showing a situation where running position data of a transportation vehicle is transmitted to the vending machine 1 via the host computer. A position of a transportation vehicle may be displayed on a map provided in advance.

Then, the control unit 15 instructs the money receiving device 6 to pay back the amount of dropped-in money (S025) and returns the processing to S001.

As mentioned above, in the vending machine according to the embodiment, a distributor can grasp the status of merchandise sales and inventory on a real time basis and at the same time, can investigate the taste of a customer who has bought merchandise, and in addition, a customer's volition to purchase can be aroused. Further, a customer can recognize merchandise by just looking at the vending machine, and in addition, if merchandise he/she wishes to buy is sold out, he/she can obtain information on the running position of the transportation vehicle for supplementing the merchandise.

As explained above, according to the present invention, a distributor can grasp the status of merchandise sales and inventory on a real time basis, and supplement, procure and produce merchandise promptly.

In addition, if a main body is made as imitating the shape of merchandise, a customer can recognize merchandise by looking at the appearance of a vending machine.

Further, if a vending machine is made as arousing a customer's volition to purchase when detecting the customer, sales can be increased.

Moreover, when the vending machine allows transmitting data answering a questionnaire to be transmitted to the host computer, the distributor can investigate the taste of a customer who purchased merchandise and can obtain materials for marketing.

Furthermore, if the vending machine is allowed to display a position of a transportation vehicle, a customer can obtain information on the running position of the transportation vehicle and can estimate an approximate time when merchandise is supplemented.

Thus, it is seen that a vending machine and distribution management system are provided. One skilled in the art will appreciate that the present invention can be practiced by other than the preferred embodiments which are presented for the purpose of illustration, and not of limitation, and the present invention is limited only by the claims which follow.

What is claimed is:

1. A distribution management system comprising;

a plurality of vending machines installed in a plurality of sites; and a host computer connected to said vending machines respectively by a communication line; which manages travelling of a transportation vehicle for delivering merchandise to said vending machines, wherein:

said transportation vehicle comprises:

running position data acquiring means for acquiring data of its own running position; and running position data transmitting means for transmitting said running position data to said host computer, said vending machine comprises:

merchandise storing means for storing said merchandise;

money receiving means for receiving payment for said merchandise;

merchandise taking out means for taking out merchandise from said merchandise storing means and selling said merchandise on condition that payment is made to said money receiving means;

merchandise data transmitting means for transmitting data concerning said merchandise sold by said merchandise taking out means to the host computer;

running position data receiving means for receiving said running position data from said host computer; and displaying means for showing the position of said transportation vehicle corresponding to said running position data, and said host computer comprises:

merchandise data receiving means for receiving data concerning said merchandise;

merchandise managing means for adding up data concerning said merchandise and managing distribution of merchandise;

running position data receiving means for receiving said running position data from said transportation vehicle; and running position data transmitting means for transmitting said running position data to said vending machine.

2. The distribution management system according to claim 1, wherein:

said vending machine comprising:

questionnaire displaying means for displaying contents of a questionnaire;

questionnaire answer inputting means for inputting data answering said questionnaire; and questionnaire answer data transmitting means for transmitting data answering said questionnaire input by said questionnaire answer inputting means to the host computer, and said host computer comprises:

questionnaire answer data receiving means for receiving data answering said questionnaire; and questionnaire answer data adding up means for adding up data answering said questionnaire and preparing materials for marketing.

* * * * *